Patented Nov. 6, 1928.

1,690,760

UNITED STATES PATENT OFFICE.

ERNEST H. VOLWILER, OF HIGHLAND PARK, ILLINOIS, ASSIGNOR TO ABBOTT LABORATORIES, OF NORTH CHICAGO, ILLINOIS, A CORPORATION OF ILLINOIS.

ENTERIC COATED CAPSULE.

No Drawing.      Application filed January 5, 1927. Serial No. 159,242.

Many medicaments for oral administration are put into capsules, usually of gelatin; this conceals the taste of the drug, and enhances the ease of administration. Gelatin capsules usually break up upon reaching the stomach, whereas it is often desired to have the drug protected until it reaches the upper intestines. Certain drugs are irritating to the stomach, while others are precipitated by the gastric contents, causing the drugs to lose their therapeutic activity.

In order to permit the capsule to reach the upper intestines, so-called enteric coatings are employed as protective coverings for the capsule. Many substances have been used in this manner, including keratin, salol, shellac, stearic acid, etc. Also attempts have been made to harden the gelatin itself by formaldehyde. A very narrow range between disintegration and non-disintegration of the capsule must be maintained, however. The capsule must go through the stomach without the development of even a minute aperture, which would permit the gastric juice to enter, while the capsule must readily and quickly disintegrate soon after it passes out of the stomach.

This balance is very difficult to attain with the enteric coatings heretofore known and used; many of them do not withstand the action in the stomach quite long enough, while others pass too far into the intestines before they are disintegrated and the contents absorbed. Furthermore, some of the coatings upon aging, change in solubility and are therefore undesirable.

I have now discovered that a very desirable enteric coating for capsules is obtained by treating the closed capsule with solutions of esters of cellulose. This class of products includes nitro-cellulose, and acetyl-cellulose. When dry, these coatings are stable and do not change in solubility; they are edible, and the thickness of the coating may readily be adjusted so that it can resist mechanical abrasion in the stomach, but will readily disintegrate in the intestines.

To carry out my invention, the closed gelatin capsules may, for example, be dropped into a vessel containing a solution of one of the cellulose esters, allowed to remain a short time, the excess solution drained off, and the capsules spread out to dry, whereupon they are ready for use.

As a specific example, the capsules are put into a lacquer (consisting of nitro-cellulose in a mixture of organic solvents), allowed to remain a short time, the lacquer solution drained off, and the capsules dried. The thickness of the coating may readily be adjusted by diluting the lacquer solution with the necessary amount of a suitable solvent, such as ethyl acetate or alcohol. The concentrations and temperature may be varied within wide limits.

The described details are illustrative of a single application only of my invention, the scope of which should be determined by reference to the appended claims.

I claim as my invention:

1. As a new article of manufacture, a medicinal capsule coated with a cellulose ester, such as used in the preparation of so-called artificial silk and cellulose lacquers.

2. As a new article of manufacture, a medicinal capsule coated with a nitro-cellulose.

3. As a new article of manufacture, a medicinal gelatin capsule coated with a nitrocellulose.

4. As a new article of manufacture, a medicinal capsule comprising a gelatin shell filled with a medicine, and a lacquer coating on the outside of said shell.

5. As a new article of manufacture, a medicinal capsule comprising a gelatin shell filled with a medicine, and a cellulose ester lacquer coating on the outside of said shell.

ERNEST H. VOLWILER.